UNITED STATES PATENT OFFICE.

FRANCIS MUDIE SPENCE, DAVID DICK SPENCE, AND THOMAS JOHN IRELAND CRAIG, OF MANCHESTER, AND JOHN JAMES HOOD, OF LONDON, ENGLAND, ASSIGNORS TO PETER SPENCE & SONS, LIMITED, OF MANCHESTER, ENGLAND.

METHOD OF MAKING SODIUM BICHROMATE.

SPECIFICATION forming part of Letters Patent No. 725,501, dated April 14, 1903.

Application filed May 13, 1901. Serial No. 60,012. (No specimens.)

*To all whom it may concern:*

Be it known that we, FRANCIS MUDIE SPENCE, DAVID DICK SPENCE, and THOMAS JOHN IRELAND CRAIG, residents of Manchester, in the county of Lancaster, and JOHN JAMES HOOD, a resident of London, in the county of Middlesex, England, citizens of the British Empire, have invented certain new and useful Improvements in and Connected with the Manufacture of Sodium Bichromate, of which the following is a full, clear, and exact description.

In the manufacture of sodium bichromate as at present largely carried out a sodium-chromate solution obtained from a frit containing such chromate is treated with a suitable acid in such a manner that one-half of the soda present is combined with that acid (sulfuric acid, for example) to produce a sodium salt, (sulfate, for example,) which is thereupon salted out and separated from the resulting solution of sodium bichromate. The bichromate solution is then concentrated to the strength required.

In our new process hereinafter described one-half, or thereabout, of the sodium contained in the sodium-chromate solution is recovered therefrom in the much more valuable form of sodium bicarbonate, which is comparatively insoluble, and consequently easily separable from the solution.

Briefly, our process consists in acting upon the sodium-chromate solution with carbonic acid and ammonia, thereby producing a solution of sodium and ammonium chromates and a precipitate of sodium bicarbonate. The ammonia which is in combination with chromic acid and any volatile ammonia which may be present are expelled from the separated solution of sodium and ammonium chromates, thereby producing sodium bichromate.

In carrying out our invention we prepare a solution of sodium chromate, either from a frit, as at present commonly practiced, or otherwise. The strength of the solution may vary; but for general purposes it may have a specific gravity of about 1.35. The reaction will equally take place if the specific gravity be higher or lower than this; but if the solution be much stronger—a cold saturated solution, for example—the precipitated sodium bicarbonate when removed from the solution mechanically retains more of the chromate liquor. On the other hand, a weaker solution may be employed; but it should not be more dilute than will allow of the precipitation as sodium bicarbonate of one-half or about one-half of the soda present. This solution is acted upon by carbonic acid and ammonia jointly or by carbonic acid and ammonium carbonate jointly until one-half or about one-half of the sodium of the sodium chromate has been precipitated as sodium bicarbonate and one-half or about one-half of the chromic acid has combined with ammonia as ammonium chromate. The resulting solution contains sodium chromate and ammonium chromate in equal or about equal molecular proportions. The ammonia may be conveniently employed either in the form of a strong aqueous solution or in the gaseous condition. Any calcium present in the chromate solution will be precipitated during the carbonation and ammoniation as calcium carbonate, together with the sodium bicarbonate.

We find that it is generally advantageous to use a quantity of ammonia somewhat in excess of that which is theoretically required to combine with one-half or about one-half of the chromic acid present in the original solution.

The carbonation and ammoniation are carried out in a closed vessel, and the contents of the vessel should be kept in motion, so as to continually expose new surfaces to the action of the carbonating and ammoniating agents.

The process is efficient at ordinary atmospheric pressures; but we may nevertheless employ an increased pressure to promote a more rapid absorption of the carbonic acid.

The carbonation and ammoniation tend to raise the temperature of the solution; but although precipitation of the sodium bicarbonate is more readily effected when working in the cold we may conduct the operation at a somewhat-increased temperature, in which case we employ a stronger solution of sodium chromate than that hereinbefore specified. Upon the completion of this part of the operation we separate the solution now containing ammonium chromate and sodium chromate from the precipitated sodium bicarbonate.

The precipitated sodium bicarbonate may be used in industry after all adhering chromate solution has been removed therefrom by washing and draining. Alternatively it may be heated to drive off one-half, or thereabout, of its carbonic acid. The carbonic acid thus liberated may be reused in the carbonating and ammoniating operation, and the residual sodium carbonate may be mixed with chrome ore and an excess of lime in the production of a frit, as at present practiced, to be used as a source from which the sodium-chromate solution is obtained, or the sodium bicarbonate may be employed in the production of the frit without having first been deprived of any of its carbonic acid.

If it is found that during the carbonation and ammoniation process more than one-half of the soda of the sodium chromate has been precipitated as bicarbonate, we may add to the solution separated therefrom a sufficient quantity of sodium-chromate solution to give equal or nearly equal molecular proportions therein of sodium chromate and ammonium chromate.

The separated solution of sodium chromate and ammonium chromate is boiled in a suitable closed vessel to drive off the ammonia of the ammonium chromate and any volatile ammonia which may be present, thereby causing the formation of a sodium-bichromate solution, which may be concentrated to any desired strength. The ammonia driven off during the boiling is recovered by condensation or otherwise and may be utilized in the carbonation and ammoniation operation.

Should it be desired to obtain a product containing a proportion of monochromate, we stop the carbonation and ammoniation before the full half of the sodium present as sodium monochromate has been precipitated as sodium bicarbonate, or we may obtain the same result by employing in the carbonation and ammoniation a less quantity of ammonia than is necessary to convert one-half, or thereabout, of the chromic acid present into ammonium chromate.

Having now particularly described and ascertained the nature of our said invention and in what manner the same is to be performed, we declare that what we claim is—

1. The hereinbefore-described process for the production of sodium bichromate which consists in passing carbon dioxid into a solution containing both sodium monochromate and ammonia until about one-half of the sodium has precipitated as sodium bicarbonate and concurrently about one-half of the chromic acid has combined with ammonia as ammonium monochromate, separating the precipitated sodium bicarbonate, boiling the solution of sodium monochromate and ammonium monochromate to drive off the ammonia, and further concentrating the thus-formed sodium-bichromate solution, substantially as described.

2. The hereinbefore-described process for the production of a solution containing both monochromate of soda and monochromate of ammonia, which consists in treating a solution of monochromate of soda with ammonia and passing carbonic-acid gas therein and thereby throwing out of solution in combination with carbonic acid about one-half of the soda of the monochromate of soda.

In testimony whereof we have signed our names to this specification in the presence of the subscribing witnesses.

FRANCIS MUDIE SPENCE.
  DAVID DICK SPENCE.
  THOMAS JOHN IRELAND CRAIG.
  JOHN JAMES HOOD.

Witnesses as to signatures of Francis Mudie Spence, David Dick Spence, and Thomas John Ireland Craig:
  ARTHUR MILLWARD,
  GEORG NOHL.

Witnesses as to signature of John James Hood:
  RICHARD BENNETT JANE,
  ARTHUR CARRICK.